(12) United States Patent
Zhang et al.

(10) Patent No.: US 11,107,277 B2
(45) Date of Patent: Aug. 31, 2021

(54) METHOD AND DEVICE FOR CONSTRUCTING 3D SCENE MODEL

(71) Applicant: HANGZHOU HIKVISION DIGITAL TECHNOLOGY CO., LTD., Hangzhou (CN)

(72) Inventors: Kui Zhang, Hangzhou (CN); Jie Li, Hangzhou (CN); Yangqin Li, Hangzhou (CN); Chao Wang, Hangzhou (CN); Hui Mao, Hangzhou (CN); Shiliang Pu, Hangzhou (CN)

(73) Assignee: HANGZHOU HIKVISION DIGITAL TECHNOLOGY CO., LTD., Hangzhou (CN)

( * ) Notice: Subject to any disclaimer, the term of this patent is extended or adjusted under 35 U.S.C. 154(b) by 51 days.

(21) Appl. No.: 16/342,466

(22) PCT Filed: Oct. 11, 2017

(86) PCT No.: PCT/CN2017/105716
§ 371 (c)(1),
(2) Date: Apr. 16, 2019

(87) PCT Pub. No.: WO2018/072630
PCT Pub. Date: Apr. 26, 2018

(65) Prior Publication Data
US 2019/0272671 A1    Sep. 5, 2019

(30) Foreign Application Priority Data
Oct. 17, 2016    (CN) .......................... 201610902421.2

(51) Int. Cl.
*G06T 17/20*        (2006.01)
*G06T 7/73*         (2017.01)
(Continued)

(52) U.S. Cl.
CPC ................ *G06T 17/20* (2013.01); *G06T 7/73* (2017.01); *G06T 15/04* (2013.01); *G06T 17/00* (2013.01);
(Continued)

(58) Field of Classification Search
CPC ........... G06T 17/20; G06T 7/73; G06T 15/04; G06T 17/00; G06T 2207/10028;
(Continued)

(56) References Cited

U.S. PATENT DOCUMENTS 9,880,010 B2 *   1/2018   Miksa .................... G01C 21/28
10,497,129 B1 * 12/2019   Cui ...................... G06K 9/4661
(Continued)

FOREIGN PATENT DOCUMENTS

CN    101917636    12/2010
CN    102036054    4/2011
(Continued)

OTHER PUBLICATIONS

Dou et al., "Temporally enhanced 3D capture of room-sized dynamic scenes with commodity depth cameras" *IEEE Virtual Reality* 2014, 39-44.
(Continued)

*Primary Examiner* — Abderrahim Merouan
(74) *Attorney, Agent, or Firm* — Norton Rose Fulbright US LLP (57) ABSTRACT

A method and apparatus for constructing a 3D scene model are provided. The method includes: acquiring a first point cloud corresponding to a current target scene (S101); determining a first partial point cloud corresponding to a dynamic object from the first point cloud (S102); constructing a foreground 3D model based on the first partial point cloud (S103); and superimposing the foreground 3D model with a background 3D model to obtain a current 3D scene model
(Continued)

(S104). As can be seen, it is not necessary to fuse each pixel acquired by each depth camera. Instead, the dynamic object is determined in the point cloud acquired by the depth camera. Only the foreground 3D model corresponding to the dynamic object is superimposed with the background 3D model corresponding to the static objects obtained in advance. This reduces the amount of computation to build a 3D scene model.

12 Claims, 2 Drawing Sheets

(51) Int. Cl.
*G06T 15/04* (2011.01)
*G06T 17/00* (2006.01)

(52) U.S. Cl.
CPC ............. *G06T 2207/10028* (2013.01); *G06T 2210/56* (2013.01); *G06T 2210/61* (2013.01)

(58) Field of Classification Search
CPC ............ G06T 2210/56; G06T 2210/61; G06T 2215/16; G06T 19/006; G06K 9/00664–00704; G06K 9/00671; A61B 2019/5291; A61B 2090/365; A63F 2300/8082; G05D 1/0038; G05D 1/0044; G05B 2219/32246; G05B 2219/36432; G05B 2219/40131; G05B 2219/32014; G05B 2219/39449; G05B 2219/39451; G06F 3/011–015; H04M 2203/359; H04N 2201/3245; H04L 29/06034; H04L 67/38
See application file for complete search history.

(56) References Cited

U.S. PATENT DOCUMENTS

| | | | | |
|---|---|---|---|---|
| 2003/0235344 | A1* | 12/2003 | Kang | G06T 5/003 382/284 |
| 2014/0320491 | A1 | 10/2014 | Dai et al. | |
| 2015/0042510 | A1* | 2/2015 | Carande | G01S 13/90 342/25 C |
| 2015/0350716 | A1* | 12/2015 | Kruglick | H04N 21/44008 386/241 |
| 2016/0104274 | A1* | 4/2016 | Jovanovski | H04N 13/254 348/46 |
| 2016/0187130 | A1* | 6/2016 | Metzler | G01C 1/04 382/109 |
| 2016/0321820 | A1* | 11/2016 | Ely | G06T 7/246 |
| 2017/0124848 | A1* | 5/2017 | Zhou | G08B 21/22 |
| 2017/0257414 | A1* | 9/2017 | Zaletel | G06F 16/252 |
| 2018/0005441 | A1* | 1/2018 | Anderson | G06T 19/006 |
| 2019/0138803 | A1* | 5/2019 | Okada | H04N 21/44008 |
| 2019/0272671 | A1* | 9/2019 | Zhang | G06T 7/73 |
| 2019/0360810 | A1* | 11/2019 | Johnson | G06T 7/50 |
| 2020/0081530 | A1* | 3/2020 | Greenberg | G06T 19/006 |
| 2020/0126257 | A1* | 4/2020 | Tauber | G06T 7/292 |

FOREIGN PATENT DOCUMENTS

| | | |
|---|---|---|
| CN | 102903144 | 1/2013 |
| CN | 103198523 | 7/2013 |
| CN | 104933755 | 9/2015 |

OTHER PUBLICATIONS

Extended European Search Report issued in corresponding European Patent Application No. 17862399.7 dated Jul. 26, 2019.

Jiang et al., "Static-Map and Dynamic Object Reconstruction in Outdoor Scenes Using 3-D Motion Segmentation" IEEE Robotics and Automation Letters 2016, 1(1), 324-331.

Kim et al., "Outdoor Dynamic 3-D Scene Reconstruction" *IEEE Transactions on Circuits and Systems for Video Technology* 2012, 22(11), 1611-1622.

Litomisky et al., "Removing Moving Objects from Point Cloud Scenes" *International Conference on Computer Analysis of Images and Patterns* 2013, 50-58.

International Search Report and Written Opinion issued in International Patent Application No. PCT/CN2017/105716, dated Jan. 16, 2018.

Qian, Ai, "Three-Dimensional Model Construction and the Design and Implementation of Dynamic Target Recognition Algorithm" A Thesis in Computer Software and Theory, Northeastern University, Jun. 2011. (English Abstract).

Extended European Search Report issued in counterpart European Application No. 17862399, dated Oct. 21, 2019.

Office Action issued in counterpart Chinese Application No. 201610902421, dated Oct. 9, 2019 (English Translation Not Available).

Pomerleau et al. "A Review of Point Cloud Registration Algorithms for Mobile Robotics" *Foundations and Trends in Robotics* 2015, 108 pages.

Ricang "Three-Dimensional Reconstruction Technique Application Research Based on Kinect Depth Sensor" South China University of Technology 2013, 74 pages (English Abstract).

* cited by examiner

METHOD AND DEVICE FOR CONSTRUCTING 3D SCENE MODEL

CROSS-REFERENCE TO RELATED APPLICATIONS

The present application is a national phase under 35 U.S.C. § 371 of International Application No. PCT/CN2017/105716, filed Oct. 11, 2017, which claims priority to Chinese patent application No. 201610902421.2, filed with the China National Intellectual Property Administration on Oct. 17, 2016, entitled "Method and Device for Constructing 3D Scene Model", each of which are incorporated herein by reference in their entirety.

TECHNICAL FIELD

The present application relates to the field of computer vision technology, and in particular to a method and apparatus for constructing a 3D scene model.

BACKGROUND 3D scenes have shown great values in many fields with their good visual experience. The approach for constructing a 3D scene model by using a depth camera has been widely used. A depth camera is capable of capturing RGB information and depth information. Each frame acquired by the camera includes a 2D RGB image and a depth map containing depth information of each point.

Currently, a dynamic 3D scene model is generally created from data acquired by multiple depth cameras at various visual angles. In particular, the multiple depth cameras acquired data for a same scene, in which there may be static objects such as walls and furnishings as the background, and dynamic objects such as moving people as the foreground. The data acquired by a depth camera is converted into a point cloud. The point cloud is a set of data containing the 3D coordinates and color information of each pixel. The point clouds corresponding to all depth cameras at each moment are fused to create a 3D scene model for each moment and thus a dynamic 3D scene model is obtained. In the case of a dynamic object in the scene, the positions of the dynamic object in different 3D scene models are different, allowing for a realistic presentation of movements of the dynamic object.

However, in the above embodiments, in fusing the point clouds corresponding to all depth cameras at the same moment, each pixel acquired by each of the depth cameras have to be fused, which is computation intensive.

SUMMARY

The objective of the embodiments of the present application is to propose a method and apparatus for constructing a 3D scene model to reduce the amount of computation for constructing a 3D scene model.

To achieve the above objective, an embodiment of the present application discloses a method for constructing a 3D scene model. The method includes:

acquiring a first point cloud corresponding to a current target scene;

determining a first partial point cloud corresponding to a dynamic object from the first point cloud;

constructing a foreground 3D model based on the first partial point cloud; and superimposing the foreground 3D model with a pre-obtained background 3D model to obtain a current 3D scene model, wherein the background 3D model is constructed based on static objects in the target scene.

Optionally, the step of acquiring a first point cloud corresponding to a current target scene may include:

acquiring a plurality of first point clouds corresponding to the current target scene.

The step of determining a first partial point cloud corresponding to a dynamic object from the first point cloud includes:

determining a first partial point cloud corresponding to the dynamic object from each first point cloud.

The step of constructing a foreground 3D model based on the first partial point cloud includes:

transforming all the determined first partial point clouds onto a same coordinate system based on a predetermined first transformation relation among coordinate systems in which the first point clouds are located respectively, to obtain one multi-directional point cloud corresponding to the dynamic object; and constructing the foreground 3D model based on the multi-directional point cloud.

Optionally, the step of determining a first partial point cloud corresponding to a dynamic object from the first point cloud may include:

comparing the first point cloud with point clouds corresponding to a preset number of frames before a frame corresponding to the first point cloud by using a first preset algorithm, to determine the first partial point cloud corresponding to the dynamic object from the first point cloud according to a comparison result;

or, matching the first point cloud with features of a preset model by using a second preset algorithm to determine the first partial point cloud corresponding to the dynamic object based on a matching result, wherein the features of the preset model are features of a model for static objects or features of a model for dynamic objects.

Optionally, the process of constructing the background 3D model from static objects in the target scene may include:

obtaining scanned data of static objects in the target scene;

converting the scanned data into a second point cloud; and constructing the background 3D model based on the second point cloud.

Optionally, the step of acquiring a first point cloud corresponding to a current target scene may include:

receiving a current frame from a first acquisition device, wherein the current frame is obtained through acquiring an image of the current target scene by the first acquisition device; and converting the current frame into the first point cloud.

The step of obtaining scanned data of static objects in the target scene includes:

receiving the scanned data from a second acquisition device. The scanned data is obtained through scanning the static objects in the target scene by the second acquisition device.

Optionally, the step of constructing the background 3D model based on the second point cloud may include:

determining a reference frame point cloud and each of offset frame point clouds in the second point cloud;

determining an offset coefficient of each offset frame point cloud relative to the reference frame point cloud;

for each offset frame point cloud, fusing the offset frame point cloud to the reference frame point cloud based on the offset coefficient corresponding to this offset frame point cloud, to obtain a fused point cloud; and constructing the background 3D model based on the fused point cloud.

Optionally, the step of fusing an offset frame point cloud to the reference frame point cloud may include:

transforming coordinates of the offset frame point cloud based on the offset coefficient corresponding to the offset frame point cloud;

determining whether the transformed offset frame point cloud and the reference frame point cloud satisfy a closed loop principle;

if the transformed offset frame point cloud and the reference frame point cloud do not satisfy the closed loop principle, fusing the transformed offset frame point cloud and the reference frame point cloud; and if the transformed offset frame point cloud and the reference frame point cloud satisfy the closed loop principle, correcting the reference frame point cloud by using a preset algorithm and fusing the transformed offset frame point cloud and the corrected reference frame point cloud.

Optionally, the step of fusing the transformed offset frame point cloud and the reference frame point cloud may include:

for each first point in the transformed offset frame point cloud, calculating an angle between normal vectors of and/or a distance between the first point and each second point in the reference frame point cloud;

determining that a second point matches the first point if the calculation result for this second point is less than a first preset threshold;

determining a confidence of each matching second point, and determining a second point with the highest confidence as a target second point;

fusing the first point and the target second point according to a preset fusion rule to obtain a fused point; and forming the fused point cloud by all fused points, which are obtained by fusing all first points in the transformed offset frame point cloud and target second points in the reference frame point cloud respectively.

Optionally, the process of obtaining the background 3D model may include:

receiving and saving the background 3D model from a user device.

Optionally, superimposing the foreground 3D model with a pre-obtained background 3D model may include:

obtaining a pair of matching points between the foreground 3D model and the background 3D model;

obtaining a second transformation relation between the foreground 3D model and the background 3D model based on the pair of matching points by using a preset decomposition algorithm; and superimposing the foreground 3D model with the background 3D model based on the second transformation relation to obtain the current 3D scene model.

Optionally, after determining a first partial point cloud corresponding to a dynamic object from the first point cloud, the method may further include:

comparing a first point cloud other than the first partial point cloud with the background 3D model to determine a static object to be updated; and updating the background 3D model according to the static object to be updated.

To achieve the above object, an embodiment of the present application further discloses an apparatus for constructing a 3D scene model. The apparatus includes:

a first obtainment module, configured for acquiring a first point cloud corresponding to a current target scene;

a first determination module, configured for determining a first partial point cloud corresponding to a dynamic object from the first point cloud;

a first construction module, configured for constructing a foreground 3D model based on the first partial point cloud; and a superimposition module, configured for superimposing the foreground 3D model with a pre-obtained background 3D model to obtain a current 3D scene model, wherein the background 3D model is constructed based on static objects in the target scene.

Optionally, the first obtainment module may be specifically configured for acquiring a plurality of first point clouds corresponding to the current target scene;

the first determination module may be specifically configured for determining a first partial point cloud corresponding to the dynamic object from each first point cloud; and the first construction module may be specifically configured for transforming all the determined first partial point clouds onto a same coordinate system based on a predetermined first transformation relation among coordinate systems in which the first point clouds are located respectively, to obtain one multi-directional point cloud corresponding to the dynamic object; and constructing the foreground 3D model based on the multi-directional point cloud.

Optionally, the first determination may be specifically configured for:

comparing the first point cloud with point clouds corresponding to a preset number of frames before a frame corresponding to the first point cloud by using a first preset algorithm, to determine the first partial point cloud corresponding to the dynamic object from the first point cloud according to a comparison result;

or, matching the first point cloud with features of a preset model by using a second preset algorithm to determine the first partial point cloud corresponding to the dynamic object based on a matching result, wherein the features of the preset model are features of a model for static objects or features of a model for dynamic objects.

Optionally, the apparatus may further include:

a second obtainment module, configured for obtaining scanned data of static objects in the target scene;

a conversion module, configured for converting the scanned data into a second point cloud; and a second construction module, configured for constructing the background 3D model based on the second point cloud.

Optionally, the first obtainment module may be specifically configured for:

receiving a current frame from a first acquisition device, wherein the current frame is obtained through acquiring an image of the current target scene by the first acquisition device; and converting the current frame into the first point cloud.

The second obtainment module may be specifically configured for:

receiving the scanned data from a second acquisition device. The scanned data is obtained through scanning the static objects in the target scene by the second acquisition device.

Optionally, the second construction module may include:

a first determination sub-module, configured for determining a reference frame point cloud and each of offset frame point clouds in the second point cloud;

a second determination sub-module, configured for determining an offset coefficient of each offset frame point cloud relative to the reference frame point cloud;

a fusion sub-module, configured for, for each offset frame point cloud, fusing the offset frame point cloud to the reference frame point cloud based on the offset coefficient corresponding to this offset frame point cloud, to obtain a fused point cloud; and a construction sub-module, configured for constructing the background 3D model based on the fused point cloud.

Optionally, the fusion sub-module may include:

a transformation unit, configured for transforming coordinates of the offset frame point cloud based on the offset coefficient corresponding to the offset frame point cloud;

a determination unit, configured for determining whether the transformed offset frame point cloud and the reference frame point cloud satisfy a closed loop principle; and a fusion unit, configured for, if the determination unit determines that the transformed offset frame point cloud and the reference frame point cloud satisfy the closed loop principle, correcting the reference frame point cloud by using a preset algorithm and fusing the transformed offset frame point cloud and the corrected reference frame point cloud; if the determination unit determines that the transformed offset frame point cloud and the reference frame point cloud do not satisfy the closed loop principle, fusing the transformed offset frame point cloud and the reference frame point cloud.

Optionally, the fusion unit may be specifically configured for:

for each first point in the transformed offset frame point cloud, calculating an angle between normal vectors of and/or a distance between the first point and each second point in the reference frame point cloud;

determining that a second point matches the first point if the calculation result for this second point is less than a first preset threshold;

determining a confidence of each matching second point, and determining a second point with the highest confidence as a target second point;

fusing the first point and the target second point according to a preset fusion rule to obtain a fused point; and forming the fused point cloud by all fused points, which are obtained by fusing all first points in the transformed offset frame point cloud and target second points in the reference frame point cloud respectively.

Optionally, the apparatus may further include:

a first receiving module, configured for receiving and saving the background 3D model from a user device.

Optionally, the superimposition module may be specifically configured for:

obtaining a pair of matching points between the foreground 3D model and the background 3D model;

obtaining a second transformation relation between the foreground 3D model and the background 3D model based on the pair of matching points by using a preset decomposition algorithm; and superimposing the foreground 3D model with the background 3D model based on the second transformation relation to obtain the current 3D scene model.

Optionally, the apparatus may further include:

a second determination module, configured for comparing a first point cloud other than the first partial point cloud with the background 3D model to determine a static object to be updated; and an update module, configured for updating the background 3D model according to the static object to be updated.

To achieve the above objective, an embodiment of the present application further discloses an electronic device, comprising: a housing, a processor, a memory, a circuit board and a power supply circuit, wherein the circuit board is arranged inside a space enclosed by the housing, the processor and the memory are arranged on the circuit board; the power supply circuit is used to supply power for various circuits or means of the electronic device; the memory is used to store executable program codes; and the processor reads the executable program codes stored on the memory and executes a program corresponding to the executable program codes to carry out the method for constructing a 3D scene model described above.

To achieve the above objective, an embodiment of the present application further discloses executable program codes that, when executed, perform the method for constructing a 3D scene model described above.

To achieve the above objective, an embodiment of the present application further discloses a storage medium for storing executable program codes that, when executed, perform the method for constructing a 3D scene model described above.

To achieve the above object, an embodiment of the present application further discloses a system for constructing a 3D scene model. The system includes an acquisition device and a server.

The acquisition device is configured for acquiring images of the target scene and sending an acquired current frame to the server.

The server is configured for receiving the current frame and converting it into a first point cloud; determining a first partial point cloud corresponding to a dynamic object from the first point cloud; constructing a foreground 3D model based on the first partial point cloud; and superimposing the foreground 3D model with a background 3D model obtained in advice to obtain a current 3D scene model, wherein the background 3D model is constructed based on static objects in the target scene.

Optionally, the system includes a plurality of acquisition devices. The server may be used specifically for:

receiving a current frame from each acquisition device and converting each received current frame into a first point cloud; determining a first partial point cloud corresponding to the dynamic object from each first point cloud; transforming all the determined first partial point clouds onto a same coordinate system based on a predetermined first transformation relation among coordinate systems in which the first point clouds are located respectively, to obtain one multi-directional point cloud corresponding to the dynamic object; constructing the foreground 3D model based on the multi-directional point cloud; and superimposing the foreground 3D model with the pre-obtained background 3D model to obtain the current 3D scene model, wherein the background 3D model is constructed based on static objects in the target scene.

Optionally, the acquisition device may be provided further for scanning the static objects in the target scene to obtain scanned data, and sending the scanned data to the server.

The server may be provided further for receiving the scanned data, converting the scanned data into a second point cloud; and constructing the background 3D model based on the second point cloud.

With the embodiments of the present application, the background 3D model of the target scene is obtained in advance. The background 3D model is a 3D model corresponding to static objects. The first partial point cloud corresponding to the dynamic object is determined from the first point cloud corresponding to each frame of the current target scene. The foreground 3D model corresponding to the first partial point cloud is constructed. The foreground 3D model is a 3D model corresponding to the dynamic object. The foreground 3D model and the background 3D model are superimposed, and a current 3D scene model is thus obtained. The present method is applied to a first point cloud of each frame, to obtain a 3D scene model corresponding to the first point clouds of the frame. A dynamic 3D scene model is thus obtained. As can be seen, with the present method, it is not necessary to fuse each pixel acquired by each depth camera. Instead, the dynamic object is determined in the point cloud acquired by the depth camera. Only the foreground 3D model corresponding to the dynamic object is superimposed with the background 3D model corresponding to the static objects obtained in advance. This greatly reduces the amount of computation to build a 3D scene model.

BRIEF DESCRIPTION OF THE DRAWINGS

In order to more clearly describe the technical solution of the embodiments of the application and the prior art, drawings needed in the embodiments and the prior art will be briefly described below. Obviously, the drawings described below are for only some embodiments of the present application, one of ordinary skills in the art can also obtain other drawings based on these drawings without any creative efforts.

DETAILED DESCRIPTION

In order to make objectives, technical solutions and advantages of the present application more apparent, the present application now will be described in detail with reference to the accompanying drawings and by way of examples. Obviously, the embodiments described are only some of the embodiments of the present application instead of all of them. All other embodiments obtained by those of ordinary skills in the art based on the embodiments herein without any creative efforts are within the scope of the present application.

To solve the problem noted above, the embodiments of the present application provide a method and apparatus for constructing a 3D scene model. The method and the apparatus are applicable to various electronic devices such as computers and tablets, which is not limited thereto. The method for constructing a 3D scene model according to an embodiment of the present application is first described in more detail below.

Figure 1:
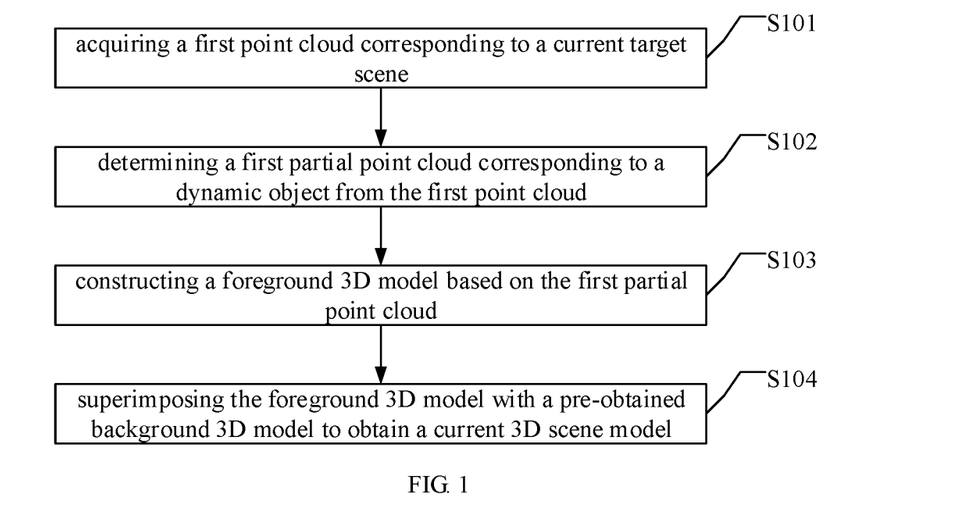
FIG. 1 is a flowchart of a method for constructing a 3D scene model according to an embodiment of the present application.

FIG. 1 is a flowchart of a method for constructing a 3D scene model according to an embodiment of the present application. The method includes:

S101: acquiring a first point cloud corresponding to a current target scene.

The first point cloud may be obtained by capturing the image of the current target scene by a first acquisition device.

Specifically, the first acquisition device acquires the image of the target scene, and sends a current frame to an electronic device implementing the present method. The electronic device receives the current frame and converts it into the first point cloud. It should be noted that the embodiment may be real-time. In the embodiment, a current frame acquired by the first acquisition device may be obtained in real time, and the current frame is converted into the first point cloud in real time. The first point cloud corresponds to the current target scene. The first acquisition device may be a depth camera.

Additionally, there may be one or more first acquisition devices. In the case of more than one acquisition devices, the acquisition devices may acquire images of the target scene from different viewing angles. In this case, the electronic device performing the present method receives a current frame from each of the first acquisition devices, and converts each current frame into a first point cloud. Each of the first point clouds corresponds to the current target scene. That is, the electronic device obtains a plurality of first point clouds corresponding to the current target scene. It should be appreciate that more first acquisition devices will obtain more first point clouds, resulting in less visual dead angles. Thus, a better 3D scene model will be constructed.

S102: determining a first partial point cloud corresponding to a dynamic object from the first point cloud.

In an implementation of the present application, a first preset algorithm may be employed to compare the first point cloud with point clouds corresponding to a preset number of frames before a frame corresponding to the first point cloud. Based on the comparison result, the first partial point cloud corresponding to the dynamic object is determined from the first point cloud.

Specifically, the first preset algorithm may be a frame difference method. As described above, the obtained first point cloud is converted from the current frame. In this embodiment, each frame may be converted into a corresponding first point cloud. Therefore, the obtained first point cloud corresponding to the current frame is compared with the point clouds corresponding to the preset number of frames before the current frame. The dynamic object may be determined based on the comparison result.

The preset number may be set according to actual needs, which may be set to for example 2. For example, the first point cloud corresponding to the current frame is a point cloud A, the first point cloud corresponding to the previous frame of the current frame is a point cloud B, and the first point cloud corresponding to the second frame before the current frame is a point cloud C.

For example, position coordinates of a point on an object in point cloud A are (100, 200, 300), position coordinates of the point in point cloud B are (90, 190, 290), and position coordinates of the point in point cloud C are (80, 180, 280).

This means that the object is moving. Thus, the object may be determined as a dynamic object, and the corresponding first partial point cloud in the point cloud A is determined.

In another implementation of the present application, a second preset algorithm is employed to match the first point cloud with features of a preset model, and determine the first partial point cloud corresponding to the dynamic object based on the matching result. The preset model is a model for static objects or a model for dynamic objects.

Specifically, the second preset algorithm may be Gaussian Background Modeling. The preset model is generally a background model, namely it may be a model for static objects, or it may be a model for dynamic objects, which is not limited herein. In the case of the model for static objects, the obtained first point cloud is matched with this model. A part that matches successfully may be determined as a static object, and a part that does not match successfully may be determined as a dynamic object. Thus, the first partial point cloud corresponding to the dynamic object is determined. Alternatively, in the case of the model for dynamic objects, in turn, a part that does not match successfully may be determined as a static object, and a part that matches successfully may be determined as a dynamic object.

As described above, multiple first acquisition devices may be used to acquire the target scene, and thus a plurality of first point clouds are obtained. In this case, a first partial point cloud corresponding to a dynamic object may be determined in each first point cloud respectively.

The approach for determining the first partial point cloud corresponding to the dynamic object in each first point cloud is the same as the approach descried above, and thus will not be repeated.

S103: constructing a foreground 3D model based on the first partial point cloud.

The point cloud contains information on positions and colors of points. A surface reconstruction may be performed based on the information on the position of each point. Common methods include, such as, Poisson surface reconstruction and Marching cubes algorithm. The foreground 3D model is obtained after the surface reconstruction is completed. Alternatively, the information on the color of each point may further be used to perform texture mapping on the reconstructed surface, to improve the visual effect of the foreground 3D model.

If there are multiple first acquisition devices, the electronic device performing the present method obtains a plurality of first point clouds, and determines a first partial point cloud corresponding to the dynamic object in each of the first point clouds respectively. In this case, all the determined first partial point clouds are transformed onto a same coordinate system based on a predetermined first transformation relation among coordinate systems in which the first point clouds are located respectively, to obtain one multi-directional point cloud corresponding to the dynamic object. The foreground 3D model is constructed based on the multi-directional point cloud.

It should be appreciated that the first acquisition devices acquire the dynamic object at different directions. For example, four first acquisition devices are used to acquire the current target scene. A first point cloud W, a first point cloud X, a first point cloud Y, and a first point cloud Z are obtained through the four first acquisition devices.

A first partial point cloud W1 is determined from the first point cloud W, which is obtained from an image of the dynamic object acquired from the front of the dynamic object. A first partial point cloud X1 is determined from the first point cloud X, which is obtained from an image of the dynamic object acquired from the back of the dynamic object. A first partial point cloud Y1 is determined from the first point cloud Y, which is obtained from an image of the dynamic object acquired from the left of the dynamic object. A first partial point cloud Z1 is determined from the first point cloud Z, which is obtained from an image of the dynamic object acquired from the right of the dynamic object.

The first transformation relation between the coordinate systems in which the first point clouds are located may be obtained by camera calibration. The first transformation relation may be understood as a transformation relation between each acquisition device and a custom coordinate system. There are many ways to calibrate a camera, for example, the conventional camera calibration method, the Zhang calibration method, the camera self-calibration method, and the like, which is not limited thereto.

The first partial point clouds W1, X1, Y1, and Z1 are transformed onto a same coordinate system (e.g., a custom coordinate system, etc.) based on the first transformation relation. Thus, a point cloud with four directions of front, back, left and right of the dynamic object is obtained, i.e., one multi-directional point cloud corresponding to the dynamic object.

The foreground 3D model is constructed based on the multi-directional point cloud.

S104: superimposing the foreground 3D model with a pre-obtained background 3D model to obtain a current 3D scene model, wherein the background 3D model is constructed based on static objects in the target scene.

The foreground 3D model may be understood as being constructed for dynamic objects (e.g., moving people or other moving objects) in the target scene, and the background 3D model may be understood as being constructed for static objects (e.g., walls, furnishings, etc.) in the target scene. The background 3D model usually does not change much, so it may be constructed in advance. After the foreground 3D model is constructed in real time, the foreground 3D model is directly superimposed with the pre-constructed background 3D model.

In an implementation, the process of constructing the background 3D model from the static objects in the target scene may include:

obtaining scanned data of static objects in the target scene; converting the scanned data into a second point cloud; and constructing the background 3D model based on the second point cloud.

Specifically, the process of obtaining the scanned data may include:

receiving the scanned data from a second acquisition device. The scanned data is obtained through scanning the static objects in the target scene by the second acquisition device.

In the present embodiment, the point cloud used to construct the foreground 3D model is called a first point cloud; and the point cloud used to construct the background 3D model is called a second point cloud. The acquisition device that acquires the first point cloud is called a first acquisition device, and the acquisition device that acquires the second point cloud is called a second acquisition device.

For example, the target scene is an indoor scene of a convenience store. An acquisition device may be set at each of the four corners within the convenience store. The four acquisition devices may serve as the first acquisition devices to acquire images of the current target scene. Further, one of these four acquisition devices may be used as the second acquisition device to scan static objects in the indoor scene in advance. Alternatively, an additional second acquisition device may be provided to scan static objects in the indoor scene in advance.

A second acquisition device is employed to scan the static objects in the target scene, in order to obtain scanned data. The electronic device performing the present method receives the scanned data sent by the second acquisition device, and converts it into a second point cloud. The specific process of constructing the background model based on the second point cloud may include:

(1) determining a reference frame point cloud and each of offset frame point clouds in the second point cloud.

It can be understand that the scanned data contains multiple frames, each of which is converted into a point cloud. That is, the second point cloud includes point clouds for a plurality of frames.

Specifically, the point cloud for the first frame may serve as the reference frame point cloud, or the point cloud for other frame may serve as the reference frame point cloud, which is not limited herein. In the second point cloud, all the other point clouds other than the reference frame point cloud are offset frame point clouds.

(2) determining an offset coefficient of each offset frame point cloud relative to the reference frame point cloud. The offset coefficient may be understood as a rotation and translation relation, namely, the rotation and translation relation of the coordinate system of the offset frame point cloud relative to the coordinate system of the reference frame point cloud. The offset coefficient may also understood as a rotation and translation relation of the gesture of the camera corresponding to the offset frame point cloud with respect to the gesture of the camera corresponding to the reference frame point cloud.

By way of an example, the gesture of the camera corresponding to the point cloud for the k-th frame is $P_k$, $P_k=[R_k, T_k]$, where $R_k$ may represent a rotation gesture and $T_k$ may represent a translation gesture. $P_k=H*P_{k-1}$, $P_{k-1}$ is the gesture of the camera corresponding to the point cloud for the (k−1)-th frame, and H is the rotation and translation relation of the gesture of the camera corresponding to the point cloud for the k-th frame relative to the gesture of the camera corresponding to the point cloud for the (k−1)-th frame. H is solved from frame to frame, and the offset coefficient between $P_k$ and $P_i$ can be finally determined. That is, the rotation and translation relation of the gesture of the camera corresponding to the k-th point cloud relative to the gesture of the camera corresponding to the reference frame point cloud.

In an implementation, the offset coefficient may be determined using the ICP algorithm. Specifically, the Gauss-Newton non-linear least squares method may be used. Compared to the conventional IPC algorithm, the error function of the Gauss-Newton method can consider not only the distance error after transformation but also the color error after the transformation. The error function may be: $E=E_{ICP}+\omega E_{RGB}$, where E is the total error; $E_{ICP}$ may be the distance error obtained by the conventional IPC algorithm; $E_{RGB}$ may be the color error; and $\omega$ is the weight of the color error, which may be set according to actual requirements, for example, 0.1.

(3) for each offset frame point cloud, fusing the offset frame point cloud to the reference frame point cloud based on the offset coefficient corresponding to this offset frame point cloud, to obtain a fused point cloud.

Specifically, the coordinates of the offset frame point cloud are transformed based on the offset coefficient corresponding to the offset frame point cloud.

It is determined whether the transformed offset frame point cloud and the reference frame point cloud satisfy a closed loop principle.

If so, the reference frame point cloud is corrected using a preset algorithm, and the transformed offset frame point cloud and the corrected reference frame point cloud are fused.

If not, the transformed offset frame point cloud and the reference frame point cloud are fused.

Satisfying the closed loop principle means that the transformed offset frame point cloud and the reference frame point cloud satisfy the global closed loop or the partial closed loop when subject to scanning. The local closed loop means that the current scanning position returns to a scanning position in the middle. The global closed loop means that the current scanning position coincides with the starting scanning position.

If they satisfy the closed loop principle, the preset algorithm is used to correct the reference frame point cloud, and the corrected reference frame point cloud and the transformed offset frame point cloud are then fused. In this way, the problem of error accumulation caused in determining the offset coefficient of each offset frame point cloud relative to the reference frame point cloud can be addressed.

If they do not satisfy the closed loop principle, it is not possible to correct the reference frame point cloud by using the preset algorithm. In this case, the transformed offset frame point cloud and the reference frame point cloud are fused directly.

The preset algorithm may be a general correction algorithm, which is not limited herein.

In the present implementation, fusing a transformed offset frame point cloud to the reference frame point cloud includes: for each first point in the transformed offset frame point cloud, calculating an angle between normal vectors of and/or a distance between the first point and each second point in the reference frame point cloud; determining that a second point matches the first point if the calculation result for this second point is less than a first preset threshold; determining a confidence of each matching second point, and determining a second point with the highest confidence as a target second point; fusing the first point and the target second point according to a preset fusion rule to obtain a fused point; and forming the fused point cloud by all fused points, which are obtained by fusing all first points in the transformed offset frame point cloud and target second points in the reference frame point cloud respectively.

In other words, due to inevitable errors, there may be multiple layers at certain parts of the junction between the offset frame point cloud and the reference frame point cloud after they are transformed into a same coordinate system. If the point clouds transformed onto the same coordinate system are directly used to construct the background 3D model, it may cause defects on the surface of the model, such as redundant patches, rough, and obvious stitching marks. Therefore, the point clouds transformed onto the same coordinate system are subject to data fusion process.

For each first point in the transformed offset frame point cloud, the angle between the normal vectors of and/or the distance between the first point and each of second points in the reference frame point cloud are calculated. If the calculation result for a second point is less than the first preset threshold, this second point is determined to match the first point. In this way, a set of candidate matching points for the first point is filtered out. The second point with the highest confidence in the set of candidate matching points is determined as the matching point of the first point, i.e., a target second point. Specifically, the formula for calculating the confidence $c_t$ of a second point at the current moment may be: $c_t=c_{t-1}+\alpha$, $\alpha=e^{-\gamma^2/2\sigma^2}$, where $c_{t-1}$ represents the confidence of this second point at the previous moment, $\gamma$ represents the depth information of the second point, and $\sigma$ represents a preset value.

For example, the first point is $(V_c, N_c)$. the second point that matches the first point is $(V_g, N_g)$. The preset fusion rule may be $$V = \frac{c_t V_c + a V_g}{c_t + a}, n = \frac{c_t n_c + a n_g}{c_t + a},$$

where V represents the coordinates of the fused point, and n represents the normal vector of the fused point. Only the fused points are retained, and the first points and the target second points are deleted. After all first points in the transformed offset frame point cloud are fused with the target second points in the reference frame point cloud respectively, the fused point cloud is formed by all fused points.

(4) constructing the background 3D model based on the fused point cloud.

The fused point cloud contains information on positions and colors of points. A surface reconstruction may be performed based on the information on the position of each point. Common methods include, such as, Poisson surface reconstruction and Marching cubes algorithm. The background 3D model is obtained after the surface reconstruction is completed. Alternatively, the information on the color of each point may further be used to perform texture mapping on the surface, to improve the visual effect of the background 3D model.

In another implementation, a background 3D model from a user device may be received and stored, and the background 3D model is thus obtained. That is, the present method may be implemented by using a background 3D model built by other user devices.

Superimposing the foreground 3D model with a pre-obtained background 3D model, may include:

obtaining a pair of matching points between the foreground 3D model and the background 3D model;

obtaining a second transformation relation between the foreground 3D model and the background 3D model based on the pair of matching points by using a preset decomposition algorithm; and superimposing the foreground 3D model with the background 3D model based on the second transformation relation to obtain the current 3D scene model.

Specifically, the pair of matching points may be obtained by matching feature points, for example but not limited to NARFs (Normal Aligned Radial Features) or PPF (Point Pair Features) in the foreground 3D model and the background 3D model.

The transformation relation between the foreground model and the background model may be obtained by the SVD (singular value decomposition) algorithm or other decomposition algorithm and based on the obtained pair of matching points.

The foreground 3D model is superimposed onto the background 3D model according to the transformation relation, and the current 3D scene model is thus obtained.

In an implementation of the present application, after the first partial point cloud corresponding to the dynamic object is determined from the first point cloud, a first point cloud other than the first partial point cloud may be compared with the background 3D model to determine a static object to be updated. The background 3D model is updated according to the static object to be updated.

The background 3D model is obtained in advance. The foreground 3D model is obtained in real time. The first point cloud is also obtained in real time. The background 3D model may not be exactly the same as the current target scene. Therefore, the first partial point cloud corresponding to the dynamic object is determined from the first point cloud. First point clouds other than the first partial point cloud, i.e., the partial point cloud corresponding to the static object, may be understood as a partial point cloud corresponding to the current background 3D model. The first point clouds other than the first partial point cloud are compared to the background 3D model. If there is a different part, this part may be taken as the static object to be updated.

By way of example, there is a table in the pre-obtained background 3D model. The first point clouds other than the first partial point cloud are compared with the background 3D model. In the case that the table does not exist in the current scene, the table is not included in the first point clouds other than the first partial point cloud. The table is then determined as a static object to be updated. The background 3D model is updated according to the static object to be updated, that is, point clouds corresponding to the table in the background 3D model are deleted.

Alternatively, the pre-obtained background 3D model does not contain a vase. The first point clouds other than the first partial point cloud are compared with the background 3D model. In the case that there is a vase in the current scene, the vase is determined as a static object to be updated. The background 3D model is updated according to the static object to be updated. That is, the vase is added to the background 3D model.

With the embodiment shown in FIG. 1, the background 3D model of the target scene is obtained in advance. The background 3D model is a 3D model corresponding to static objects. The first partial point cloud corresponding to the dynamic object is determined from the first point cloud corresponding to each frame of the current target scene. The foreground 3D model corresponding to the first partial point cloud is constructed. The foreground 3D model is a 3D model corresponding to the dynamic object. The foreground 3D model and the background 3D model are superimposed, and a current 3D scene model is thus obtained. The present method is applied to a first point cloud of each frame, to obtain a 3D scene model corresponding to the first point cloud of the frame. A dynamic 3D scene model is thus obtained. As can be seen, with the present method, it is not necessary to fuse each pixel acquired by each depth camera. Instead, the dynamic object is determined in the point cloud acquired by the depth camera. Only the foreground 3D model corresponding to the dynamic object is superimposed with the background 3D model corresponding to the static objects obtained in advance. This greatly reduces the amount of computation to build a 3D scene model. With the present method, even if the target scene is large, the 3D scene model corresponding to the target scene can be constructed in real time.

Figure 2:
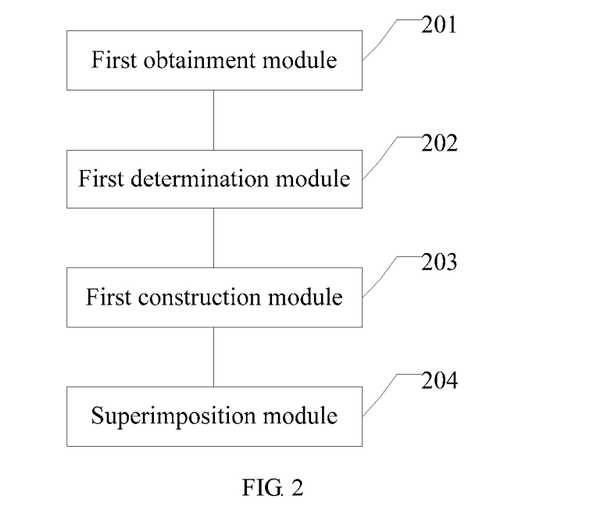
FIG. 2 is a diagram illustrating the structure of an apparatus for constructing a 3D scene model according to an embodiment of the present application.

In accordance with the embodiments of methods described above, an embodiment of the present application further provides an apparatus for constructing a 3D scene model. The apparatus includes:

a first obtainment module 201, configured for acquiring a first point cloud corresponding to a current target scene;

a first determination module 202, configured for determining a first partial point cloud corresponding to a dynamic object from the first point cloud;

a first construction module 203, configured for constructing a foreground 3D model based on the first partial point cloud; and a superimposition module 204, configured for superimposing the foreground 3D model with a pre-obtained background 3D model to obtain a current 3D scene model, wherein the background 3D model is constructed based on static objects in the target scene.

In this embodiment, the first obtainment module 201 may be specifically configured for acquiring a plurality of first point clouds corresponding to the current target scene.

The first determination module 202 may be specifically configured for determining a first partial point cloud corresponding to the dynamic object from each first point cloud.

The first construction module 203 may be specifically configured for transforming all the determined first partial point clouds onto a same coordinate system based on a predetermined first transformation relation among coordinate systems in which the first point clouds are located respectively, to obtain one multi-directional point cloud corresponding to the dynamic object; and constructing the foreground 3D model based on the multi-directional point cloud.

In this embodiment, the first determination module 202 may be specifically configured for:

comparing the first point cloud with point clouds corresponding to a preset number of frames before a frame corresponding to the first point cloud by using a first preset algorithm, to determine the first partial point cloud corresponding to the dynamic object from the first point cloud according to a comparison result;

or, matching the first point cloud with features of a preset model by using a second preset algorithm to determine the first partial point cloud corresponding to the dynamic object based on a matching result, wherein the features of the preset model are features of a model for static objects or features of a model for dynamic objects.

In this embodiment, the apparatus may further include: a second acquisition module, a conversion module, and a second construction module (not shown).

The second obtainment module is configured for obtaining scanned data of static objects in the target scene.

The conversion module is configured for converting the scanned data into a second point cloud.

The second construction module is configured for constructing the background 3D model based on the second point cloud.

In this embodiment, the first obtainment module 201 may be specifically configured for:

receiving a current frame from a first acquisition device, wherein the current frame is obtained through acquiring an image of the current target scene by the first acquisition device; and converting the current frame into the first point cloud.

The second obtainment module is specifically configured for:

receiving the scanned data from a second acquisition device. The scanned data is obtained through scanning the static objects in the target scene by the second acquisition device.

In this embodiment, the second construction module may include:

a first determination sub-module, configured for determining a reference frame point cloud and each of offset frame point clouds in the second point cloud;

a second determination sub-module, configured for determining an offset coefficient of each offset frame point cloud relative to the reference frame point cloud;

a fusion sub-module, configured for, for each offset frame point cloud, fusing the offset frame point cloud to the reference frame point cloud based on the offset coefficient corresponding to this offset frame point cloud, to obtain a fused point cloud; and a construction sub-module, configured for constructing the background 3D model based on the fused point cloud.

In this embodiment, the fusion sub-module may include:

a transformation unit, configured for transforming coordinates of the offset frame point cloud based on the offset coefficient corresponding to the offset frame point cloud;

a determination unit, configured for determining whether the transformed offset frame point cloud and the reference frame point cloud satisfy a closed loop principle; and a fusion unit, configured for, when the determination unit determines that the transformed offset frame point cloud and the reference frame point cloud do not satisfy the closed loop principle, fusing the transformed offset frame point cloud and the reference frame point cloud; and when the determination unit determines that the transformed offset frame point cloud and the reference frame point cloud satisfy the closed loop principle, correcting the reference frame point cloud by using a preset algorithm and fusing the transformed offset frame point cloud and the corrected reference frame point cloud.

In this application, the fusion unit may be specifically configured for:

for each first point in the transformed offset frame point cloud, calculating an angle between normal vectors of and/or a distance between the first point and each second point in the reference frame point cloud;

determining that a second point matches the first point if the calculation result for this second point is less than a first preset threshold;

determining a confidence of each matching second point, and determining a second point with the highest confidence as a target second point;

fusing the first point and the target second point according to a preset fusion rule to obtain a fused point; and forming the fused point cloud by all fused points, which are obtained by fusing all first points in the transformed offset frame point cloud and target second points in the reference frame point cloud respectively.

In this embodiment, the apparatus may further include:

a first receiving module (not shown), configured for receiving and saving the background 3D model from a user device.

In this embodiment, the superimposition module 204 may be specifically configured for:

obtaining a pair of matching points between the foreground 3D model and the background 3D model;

obtaining a second transformation relation between the foreground 3D model and the background 3D model based on the pair of matching points by using a preset decomposition algorithm; and superimposing the foreground 3D model with the background 3D model based on the second transformation relation to obtain the current 3D scene model.

In this embodiment, the apparatus may further include: a second determining module and an updating module (not shown).

The second determination module is configured for comparing a first point cloud other than the first partial point cloud with the background 3D model to determine a static object to be updated.

The update module is configured for updating the background 3D model according to the static object to be updated.

With the embodiment shown in FIG. 2, the background 3D model of the target scene is obtained in advance. The background 3D model is a 3D model corresponding to static objects. The first partial point cloud corresponding to the dynamic object is determined from the first point cloud corresponding to each frame of the current target scene. The foreground 3D model corresponding to the first partial point cloud is constructed. The foreground 3D model is a 3D model corresponding to the dynamic object. The foreground 3D model and the background 3D model are superimposed, and a current 3D scene model is thus obtained. The present method is applied to a first point cloud of each frame, to obtain a 3D scene model corresponding to the first point cloud of the frame. A dynamic 3D scene model is thus obtained. As can be seen, with the present method, it is not necessary to fuse each pixel acquired by each depth camera. Instead, the dynamic object is determined in the point cloud acquired by the depth camera. Only the foreground 3D model corresponding to the dynamic object is superimposed with the background 3D model corresponding to the static objects obtained in advance. This greatly reduces the amount of computation to build a 3D scene model. With the present method, even if the target scene is large, the 3D scene model corresponding to the target scene can be constructed in real time.

Figure 3:
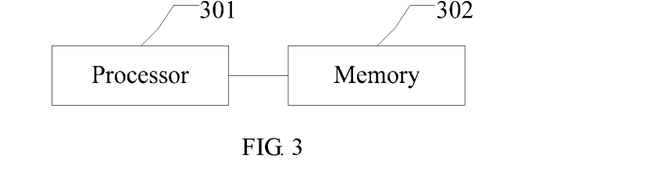
FIG. 3 is a diagram of the structure of an electronic device according to an embodiment of the present application.

An embodiment of the present application further provides an electronic device, as shown in FIG. 3, which includes a processor 301 and a memory 302.

The memory 302 is configured for storing a computer program.

The processor 301 is configured for executing the program stored on the memory 302 to carry out the method for constructing a 3D scene model, which method includes:

acquiring a first point cloud corresponding to a current target scene;

determining a first partial point cloud corresponding to a dynamic object from the first point cloud;

constructing a foreground 3D model based on the first partial point cloud; and superimposing the foreground 3D model with a pre-obtained background 3D model to obtain a current 3D scene model, wherein the background 3D model is constructed based on static objects in the target scene.

The electronic device may be but not limited to a computer, a tablet computer, a server, or the like.

With the embodiment shown in FIG. 3, the background 3D model of the target scene is obtained in advance. The background 3D model is a 3D model corresponding to static objects. The first partial point cloud corresponding to the dynamic object is determined from the first point cloud corresponding to each frame of the current target scene. The foreground 3D model corresponding to the first partial point cloud is constructed. The foreground 3D model is a 3D model corresponding to the dynamic object. The foreground 3D model and the background 3D model are superimposed, and a current 3D scene model is thus obtained. The present method is applied to a first point cloud of each frame, to obtain a 3D scene model corresponding to the first point cloud of the frame. A dynamic 3D scene model is thus obtained. As can be seen, with the present method, it is not necessary to fuse each pixel acquired by each depth camera. Instead, the dynamic object is determined in the point cloud acquired by the depth camera. Only the foreground 3D model corresponding to the dynamic object is superimposed with the background 3D model corresponding to the static objects obtained in advance. This greatly reduces the amount of computation to build a 3D scene model.

An embodiment of the present application further discloses executable program codes that, when executed, perform the method for constructing a 3D scene model. The method includes:

acquiring a first point cloud corresponding to a current target scene;

determining a first partial point cloud corresponding to a dynamic object from the first point cloud;

constructing a foreground 3D model based on the first partial point cloud; and superimposing the foreground 3D model with a pre-obtained background 3D model to obtain a current 3D scene model, wherein the background 3D model is constructed based on static objects in the target scene.

With the embodiments, the background 3D model of the target scene is obtained in advance. The background 3D model is a 3D model corresponding to static objects. The first partial point cloud corresponding to the dynamic object is determined from the first point cloud corresponding to each frame of the current target scene. The foreground 3D model corresponding to the first partial point cloud is constructed. The foreground 3D model is a 3D model corresponding to the dynamic object. The foreground 3D model and the background 3D model are superimposed, and a current 3D scene model is thus obtained. The present method is applied to a first point cloud of each frame, to obtain a 3D scene model corresponding to the first point cloud of the frame. A dynamic 3D scene model is thus obtained. As can be seen, with the present method, it is not necessary to fuse each pixel acquired by each depth camera. Instead, the dynamic object is determined in the point cloud acquired by the depth camera. Only the foreground 3D model corresponding to the dynamic object is superimposed with the background 3D model corresponding to the static objects obtained in advance. This greatly reduces the amount of computation to build a 3D scene model.

An embodiment of the present application further discloses a storage medium for storing executable program codes that, when executed, perform the method for constructing a 3D scene model. The method includes:

acquiring a first point cloud corresponding to a current target scene;

determining a first partial point cloud corresponding to a dynamic object from the first point cloud;

constructing a foreground 3D model based on the first partial point cloud; and superimposing the foreground 3D model with a pre-obtained background 3D model to obtain a current 3D scene model, wherein the background 3D model is constructed based on static objects in the target scene.

With the embodiments, the background 3D model of the target scene is obtained in advance. The background 3D model is a 3D model corresponding to static objects. The first partial point cloud corresponding to the dynamic object is determined from the first point cloud corresponding to each frame of the current target scene. The foreground 3D model corresponding to the first partial point cloud is constructed. The foreground 3D model is a 3D model corresponding to the dynamic object. The foreground 3D model and the background 3D model are superimposed, and a current 3D scene model is thus obtained. The present method is applied to a first point cloud of each frame, to obtain a 3D scene model corresponding to the first point cloud of the frame. A dynamic 3D scene model is thus obtained. As can be seen, with the present method, it is not necessary to fuse each pixel acquired by each depth camera. Instead, the dynamic object is determined in the point cloud acquired by the depth camera. Only the foreground 3D model corresponding to the dynamic object is superimposed with the background 3D model corresponding to the static objects obtained in advance. This greatly reduces the amount of computation to build a 3D scene model.

Figure 4:
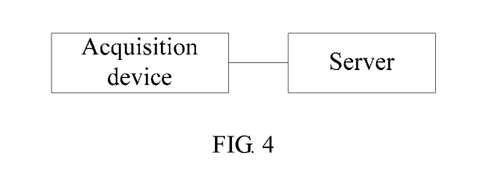
FIG. 4 is a diagram illustrating the first structure of a system for constructing a 3D scene model according to an embodiment of the present application.

An embodiment of the present application further provides a system for constructing a 3D scene model. As shown in FIG. 4, the system includes an acquisition device and a server.

The acquisition device is configured for acquiring images of a target scene and sending an acquired current frame to the server.

The server is configured for receiving the current frame and converting it into a first point cloud; determining a first partial point cloud corresponding to a dynamic object from the first point cloud; constructing a foreground 3D model based on the first partial point cloud; and superimposing the foreground 3D model with a background 3D model obtained in advice to obtain a current 3D scene model, wherein the background 3D model is constructed based on static objects in the target scene.

Figure 5:
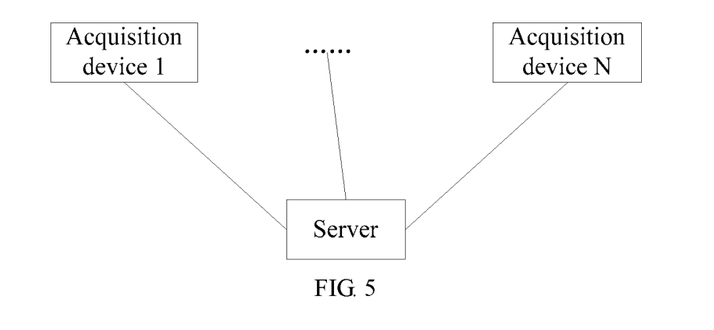
FIG. 5 is a diagram illustrating the second structure of a system for constructing a 3D scene model according to an embodiment of the present application.

In an implementation, as shown in FIG. 5, the system may include multiple acquisition devices, i.e., acquisition device 1, . . . , acquisition device N. Each acquisition device acquires the image of the target scene and sends the acquired current frame to the server.

The server may be used specifically for:

receiving a current frame from each acquisition device and converting each received current frame into a first point cloud; determining a first partial point cloud corresponding to the dynamic object from each first point cloud; transforming all the determined first partial point clouds onto a same coordinate system based on a predetermined first transformation relation among coordinate systems in which the first point clouds are located respectively, to obtain one multi-directional point cloud corresponding to the dynamic object; and constructing the foreground 3D model based on the multi-directional point cloud; superimposing the foreground 3D model with a pre-obtained background 3D model to obtain a current 3D scene model, wherein the background 3D model is constructed based on static objects in the target scene.

In an implementation, the acquisition device is further provided for scanning the static objects in the target scene to obtain scanned data, and sending the scanned data to the server.

The server is further provided for receiving the scanned data, converting the scanned data into a second point cloud; and constructing the background 3D model based on the second point cloud.

The server in the system may further be used to carry out any of the methods for constructing a 3D scene model described above. The acquisition device in the system may be but not limited to a depth camera. Other acquisition devices are possible.

It should be noted that the relationship terms herein such as "first", "second", and the like are only used for distinguishing one entity or operation from another entity or operation, but do not necessarily require or imply that there is any actual relationship or order between these entities or operations. Moreover, the terms "include", "comprise" or any other variants thereof are intended to cover non-exclusive inclusions, so that processes, methods, articles or devices comprising a series of elements comprise not only those elements listed but also those not specifically listed or the elements intrinsic to these processes, methods, articles, or devices. Without further limitations, elements defined by the sentences "comprise(s) a." or "include(s) a." do not exclude that there are other identical elements in the processes, methods, articles, or devices which include these elements.

All the embodiments are described in corresponding ways, same or similar parts in each of the embodiments can be referred to one another, and the parts emphasized are differences to other embodiments. In particular, the embodiment of the apparatus for constructing a 3D scene model shown in FIG. 2, the embodiment of the electronic device shown in FIG. 3, the embodiments of the system for constructing a 3D scene model shown in FIGS. 4-5, the embodiment of the executable program codes, and the embodiment of the storage medium are substantially similar to the embodiments of the method for constructing a 3D scene model shown in FIG. 1. Thus, the former are briefly described, and relevant parts can be referred to the description of the method embodiments for constructing a 3D scene model shown in FIG. 1.

It will be understood by those of ordinary skills in the art that all or some of the steps in the methods described above may be accomplished by a program to instruct the associated hardware. Said program may be stored in a computer-readable storage medium, such as ROMs/RAMs, magnetic disks, optical disks, or the like.

The description is only for preferred embodiments of the present application, and embodiments are not so limited. Any modifications, substitutions, improvements, etc., which are made within the spirit and principles of the present application, will fall into the protection scope of the present application.

The invention claimed is:

1. A method for constructing a 3D scene model, comprising:
   acquiring a first point cloud corresponding to a current target scene;
   determining a first partial point cloud corresponding to a dynamic object from the first point cloud;
   constructing a foreground 3D model based on the first partial point cloud; and
   superimposing the foreground 3D model with a pre-obtained background 3D model to obtain a current 3D scene model, wherein the background 3D model is constructed based on static objects in the target scene,
   wherein the process of constructing the background 3D model based on static objects in the target scene comprises:
   obtaining scanned data of static objects in the target scene;
   converting the scanned data into a second point cloud;
   determining a reference frame point cloud and each of offset frame point clouds in the second point cloud;

determining an offset coefficient of each offset frame point cloud relative to the reference frame point cloud;

for each offset frame point cloud, fusing the offset frame point cloud to the reference frame point cloud based on the offset coefficient corresponding to this offset frame point cloud, to obtain a fused point cloud; and constructing the background 3D model based on the fused point cloud, wherein fusing the offset frame point cloud to the reference frame point cloud comprises:

transforming coordinates of the offset frame point cloud based on the offset coefficient corresponding to the offset frame point cloud;

determining whether the transformed offset frame point cloud and the reference frame point cloud satisfy a closed loop principle;

if the transformed offset frame point cloud and the reference frame point cloud do not satisfy the closed loop principle, fusing the transformed offset frame point cloud and the reference frame point cloud; and if the transformed offset frame point cloud and the reference frame point cloud satisfy the closed loop principle, correcting the reference frame point cloud by using a preset algorithm and fusing the transformed offset frame point cloud and the corrected reference frame point cloud.

2. The method of claim 1, wherein the step of acquiring a first point cloud corresponding to a current target scene comprises:

acquiring a plurality of first point clouds corresponding to the current target scene;

the step of determining a first partial point cloud corresponding to a dynamic object from the first point cloud comprises:

determining a first partial point cloud corresponding to the dynamic object from each first point cloud; and the step of constructing a foreground 3D model based on the first partial point cloud comprises:

transforming all the determined first partial point clouds onto a same coordinate system based on a predetermined first transformation relation among coordinate systems in which the first point clouds are located respectively, to obtain one multi-directional point cloud corresponding to the dynamic object; and constructing the foreground 3D model based on the multi-directional point cloud.

3. The method of claim 1, wherein the step of determining a first partial point cloud corresponding to a dynamic object from the first point cloud comprises:

comparing the first point cloud with point clouds corresponding to a preset number of frames before a frame corresponding to the first point cloud by using a frame difference method, to determine the first partial point cloud corresponding to the dynamic object from the first point cloud according to a comparison result; or, matching the first point cloud with features of a preset model by using a Gaussian Background Modeling to determine the first partial point cloud corresponding to the dynamic object based on a matching result, wherein the features of the preset model are features of a model for static objects or features of a model for dynamic objects.

4. The method of claim 1, wherein the step of acquiring a first point cloud corresponding to a current target scene comprises:

receiving a current frame from a first acquisition device, wherein the current frame is obtained through acquiring an image of the current target scene by the first acquisition device; and converting the current frame into the first point cloud;

the step of obtaining scanned data of static objects in the target scene comprises:

receiving the scanned data from a second acquisition device, wherein the scanned data is obtained through scanning the static objects in the target scene by the second acquisition device.

5. The method of claim 1, wherein the step of fusing the transformed offset frame point cloud and the reference frame point cloud comprises:

for each first point in the transformed offset frame point cloud:

calculating an angle between normal vectors of and/or a distance between the first point and each second point in the reference frame point cloud;

determining that a second point matches the first point if the calculation result for this second point is less than a first preset threshold;

determining a confidence of each matching second point, and determining a second point with the highest confidence as a target second point;

fusing the first point and the target second point according to a preset fusion rule to obtain a fused point; and forming the fused point cloud by all fused points, which are obtained by fusing all first points in the transformed offset frame point cloud and target second points in the reference frame point cloud respectively.

6. The method of claim 1, wherein the process of obtaining the background 3D model comprises:

receiving and saving the background 3D model from a user device.

7. The method of claim 1, wherein superimposing the foreground 3D model with a pre-obtained background 3D model comprises:

obtaining a pair of matching points between the foreground 3D model and the background 3D model;

obtaining a second transformation relation between the foreground 3D model and the background 3D model based on the pair of matching points by using a preset decomposition algorithm; and superimposing the foreground 3D model with the background 3D model based on the second transformation relation to obtain the current 3D scene model.

8. The method of claim 1, wherein after determining a first partial point cloud corresponding to a dynamic object from the first point cloud, the method further comprises:

comparing a first point cloud other than the first partial point cloud with the background 3D model to determine a static object to be updated; and updating the background 3D model according to the static object to be updated.

9. An electronic device, comprising a processor and a memory;

the memory being configured for storing a computer program; and the processor being configured for executing the program stored on the memory to carry out the method for constructing a 3D scene model of claim 1.

10. A non-transitory storage medium, wherein the storage medium is configured for storing executable program codes that, when executed, carry out the method for constructing a 3D scene model of claim 1.

11. A system for constructing a 3D scene model, comprising an acquisition device and a server, wherein the acquisition device is configured for acquiring images of a target scene and sending an acquired current frame to the server; and the server is configured for receiving the current frame and converting the current frame into a first point cloud; determining a first partial point cloud corresponding to a dynamic object from the first point cloud; constructing a foreground 3D model based on the first partial point cloud; and superimposing the foreground 3D model with a pre-obtained background 3D model to obtain a current 3D scene model, wherein the background 3D model is constructed based on static objects in the target scene, wherein the acquisition device is further configured for scanning the static objects in the target scene to obtain scanned data, and sending the scanned data to the server; and the server is further configured for: receiving the scanned data, converting the scanned data into a second point cloud, determining a reference frame point cloud and each of offset frame point clouds in the second point cloud; determining an offset coefficient of each offset frame point cloud relative to the reference frame point cloud; for each offset frame point cloud, fusing the offset frame point cloud to the reference frame point cloud based on the offset coefficient corresponding to this offset frame point cloud, to obtain a fused point cloud; and constructing the background 3D model based on the fused point cloud;

wherein fusing the offset frame point cloud to the reference frame point cloud comprises:

transforming coordinates of the offset frame point cloud based on the offset coefficient corresponding to the offset frame point cloud;

determining whether the transformed offset frame point cloud and the reference frame point cloud satisfy a closed loop principle;

if the transformed offset frame point cloud and the reference frame point cloud do not satisfy the closed loop principle, fusing the transformed offset frame point cloud and the reference frame point cloud; and if the transformed offset frame point cloud and the reference frame point cloud satisfy the closed loop principle, correcting the reference frame point cloud by using a preset algorithm and fusing the transformed offset frame point cloud and the corrected reference frame point cloud.

12. The system of claim 11, wherein the system comprises a plurality of acquisition devices; and the server is further configured for:

receiving a current frame from each acquisition device and converting each received current frame into a first point cloud; determining a first partial point cloud corresponding to the dynamic object from each first point cloud; transforming all the determined first partial point clouds onto a same coordinate system based on a predetermined first transformation relation among coordinate systems in which the first point clouds are located respectively, to obtain one multi-directional point cloud corresponding to the dynamic object; and constructing the foreground 3D model based on the multi-directional point cloud; superimposing the foreground 3D model with the pre-obtained background 3D model to obtain the current 3D scene model, wherein the background 3D model is constructed based on static objects in the target scene.

* * * * *